Jan. 16, 1923.
G. W. WYCHE.
TRACTION AND SUPPORTING CHAIN FOR TRUCKS.
FILED AUG. 20, 1921.
1,442,590
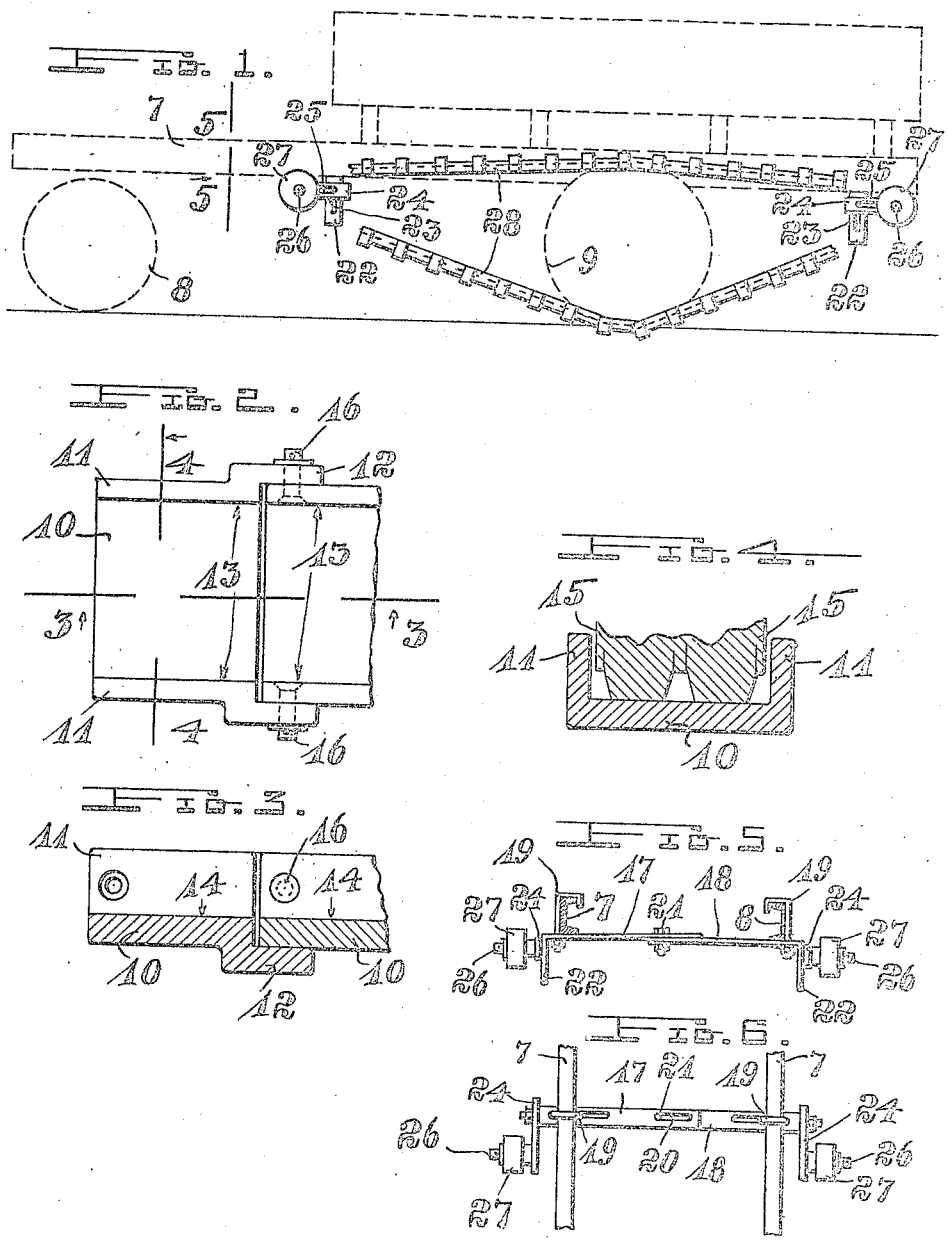
INVENTOR:
GEORGE W. WYCHE,
BY: Otto H. Rueger,
his atty.

Patented Jan. 16, 1923.

1,442,590

UNITED STATES PATENT OFFICE.

GEORGE W. WYCHE, OF SOUTH PASADENA, CALIFORNIA, ASSIGNOR OF ONE-HALF TO A. C. McROBERTS, OF PASADENA, CALIFORNIA.

TRACTION AND SUPPORTING CHAIN FOR TRUCKS.

Application filed August 20, 1921. Serial No. 494,023.

*To all whom it may concern:*

Be it known that I, GEORGE W. WYCHE, a citizen of the United States, residing at South Pasadena, in the county of Los Angeles and State of California, have invented a new and useful Traction and Supporting Chain for Trucks, of which the following is a specification.

This invention relates to devices used for preventing a skidding and slipping of vehicle wheels when driven over sandy, muddy, or other similar unfirm ground.

One of the objects of this invention is to provide a belt-like member to be placed over each driving wheel of a vehicle without any special engaging means between the belt and the wheel.

Another object is to provide adjustable means for carrying the belt in suitable relation to the driving wheel of a vehicle.

Other objects will appear from the following description and appended claim as well as from the accompanying drawing, in which—

Fig. 1 is a fragmentary side elevation of the device, the body, frame, and wheels of a truck being outlined in dotted lines to illustrate the relative position of the device to a vehicle.

Fig. 2 is a detail enlarged top plan view of a link member of the device in engagement with a portion of an adjoining link member.

Fig. 3 is a section on line 3—3 of Fig. 2.

Fig. 4 is a section on line 4—4 of Fig. 2.

Fig. 5 is a cross section through the frame of a truck, as on line 5—5 of Fig. 1, to illustrate the relative position of the supporting members and rollers for holding the belt in suitable relation to a vehicle.

Fig. 6 is a top plan view of the detail parts of the illustration in Fig. 5.

The frame or chassis 7 of a truck is normally supported by the front wheels 8 and rear wheels 9. The front wheels of a truck are normally not so liable to skid or slip as are the rear wheels. In addition to this, the rear wheels alone require normally suitable means to supply a truck with proper traction facilities.

When driving over sandy or similar unfirm surfaces, the driving wheels of a truck are liable to slip or skid, or in other words unable to propel the truck over the surface. Many times a piece of heavy canvas is sufficient, to allow a starting of a truck on such ground, or to provide the driving wheel with suitable hold on the ground that the truck may fairly well be propelled over such a ground. A board or other similar solid material is more suitable for supporting driving wheels over unfirm ground.

The belt-like device disclosed hereby is designed to facilitate a placing of the device over or under the driving wheels at a proper moment, and allowing a quick and suitable removing of the device when not required under the wheels. The belt is made of a suitable number of links pivotally connected to easily adapt itself to the contour of a driving wheel.

In Figs. 2, 3 and 4, a link member of a preferred form is illustrated, comprising the tread portion 10, the side-flanges 11, and the engaging and gripping portions 12. The engaging end of the link member is provided with an inner opening to easily engage over the opposite end of the adjoining link-member so as to provide an even channeled surface in the whole connected link-belt, as indicated at 13 in Fig. 2. The inner faces or surfaces of the tread portions are also flush, one member or link with the next adjoining, as indicated at 14 in Fig. 3. The side flanges of the link members are of a size to engage in spaced relation over the sides of a driving wheel, as indicated at 15 in Fig. 4. The several link members are pivotally connected as indicated at 16 in Figs. 2 and 3.

The bars 17 and 18 are secured to the frame or chassis 7 of a truck by the hook-bolts 19, as illustrated in Figs. 5 and 6. The bars 17 and 18 are preferably provided with slots as indicated at 20 to be connected by bolts 21, to allow a longitudinal adjustment. The opposite ends 22 of the bars 17 and 18 are bent to project downwardly from the frame or chassis of a truck, as indicated in Fig. 1. The ends 22 are provided with slots 23 to allow an adjustment in an up- and downward direction. Cross members 24 are provided adjustably connected to the ends 22, as illustrated in Figs. 1, 5 and 6. The cross members are provided with slots, indicated at 25 in Fig. 1, for facilitating an adjustment in longitudinal direction. The cross members are furthermore each provided with a stud or pin as indicated at 26 in Figs. 1, 5 and 6, to support the rollers or pulleys 27. The pulleys 27 are provided to support the endless belt-like member 28 as illustrated in Fig. 1.

A belt-like member of this type is preferably provided on both sides of a truck in suitable relation to both rear driving wheels. In the manner described above, the belt-like members are in no positive engagement or special engagement with the driving wheels. The belt-like members are practically loosely disposed around the rollers 27, and below and above the driving wheels 9, so that the driving wheels merely gain the advantage of rolling and passing over a solid surface instead of the sandy unfirm surface of the ground when the truck is driven over such ground. The driving wheels are even liable to slip to some extent on the smooth inner surface of the belt-like members in case the front wheels of the truck are sticking in the loose ground, so that the loose interengaging or touching between the driving wheels and the belt-like members serves even to some extent as an advantage, allowing the driving wheels to gradually get a hold and push the front wheels out of the loose ground without stalling the engine. The belt-like members slide loosely around the pulleys 27 as the driving wheels progress over the ground with portions of the belt-like members between the driving wheels and the ground. The belt-like members can easily be removed from this operative position, since adjustably held by the bars or members 22 and 24.

Having thus described my invention, I claim:

In a traction attachment, in combination with the driving wheels and the chassis of a truck, supporting bars having means to engage adjustably with the chassis, bent ends on said supporting bars to project downwardly from the said chassis, the bent ends having slots, cross bars having means to engage adjustably with the said supporting bars, the cross bars having slots to allow an adjusting in longitudinal relation to the said chassis, the cross bars having furthermore studs for supporting rollers, rollers turnably mounted on the studs to be turnable in a plane in alignment with the driving wheels of the truck, and a belt-like member loosely mounted over the rollers so as to pass under the driving wheels of the truck.

In testimony that I claim the foregoing as my invention I have signed my name in the presence of two subscribing witnesses.

GEORGE W. WYCHE.

Witnesses:
MIRIAM LEE,
CATHERINE LANG.